Jan. 18, 1944. L. P. CROSMAN 2,339,321
ADDING AND LISTING MACHINE
Filed July 7, 1943 7 Sheets-Sheet 1

INVENTOR
Loring P. Crosman
BY
Witness
Elmer W. Edwards
ATTORNEY

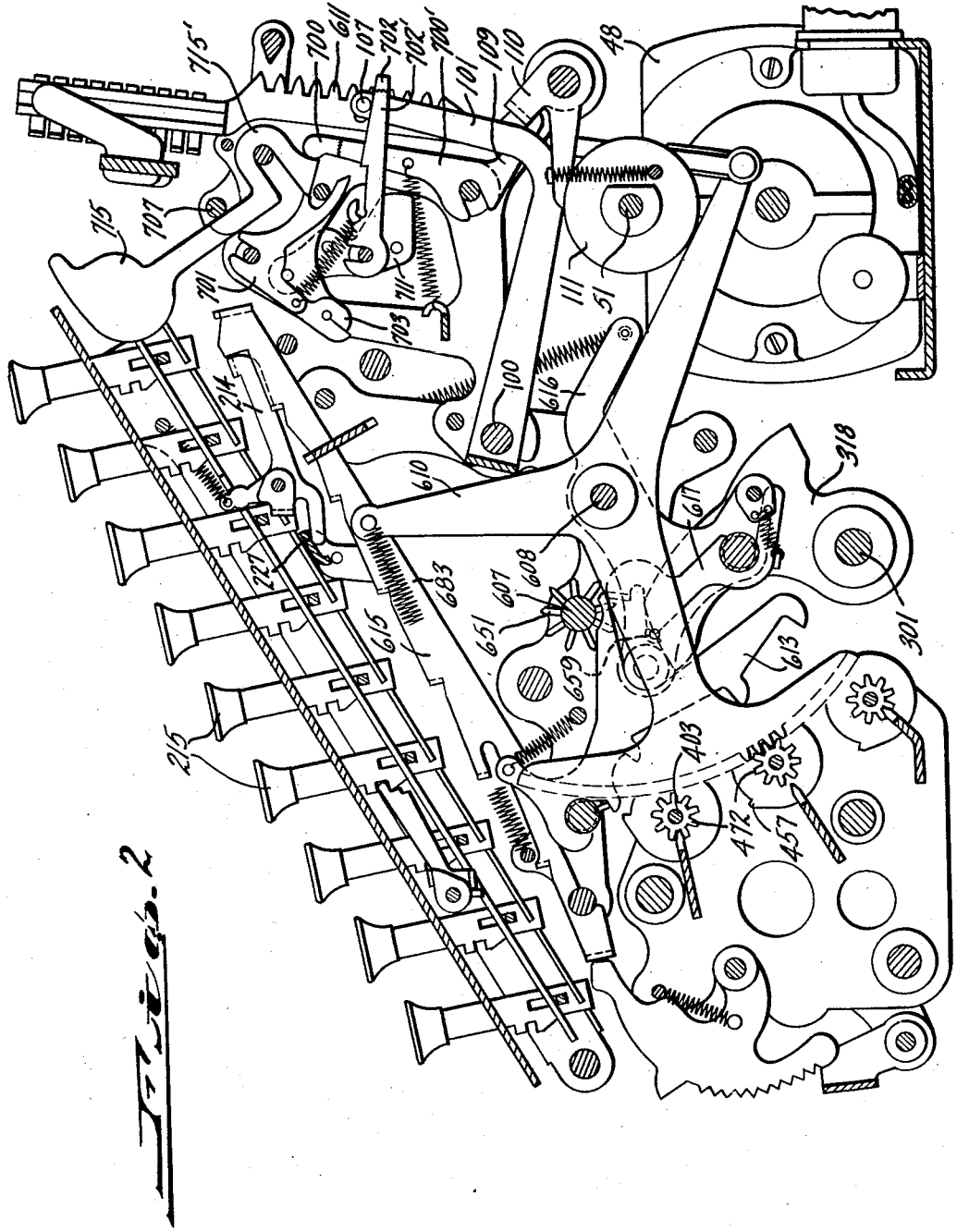

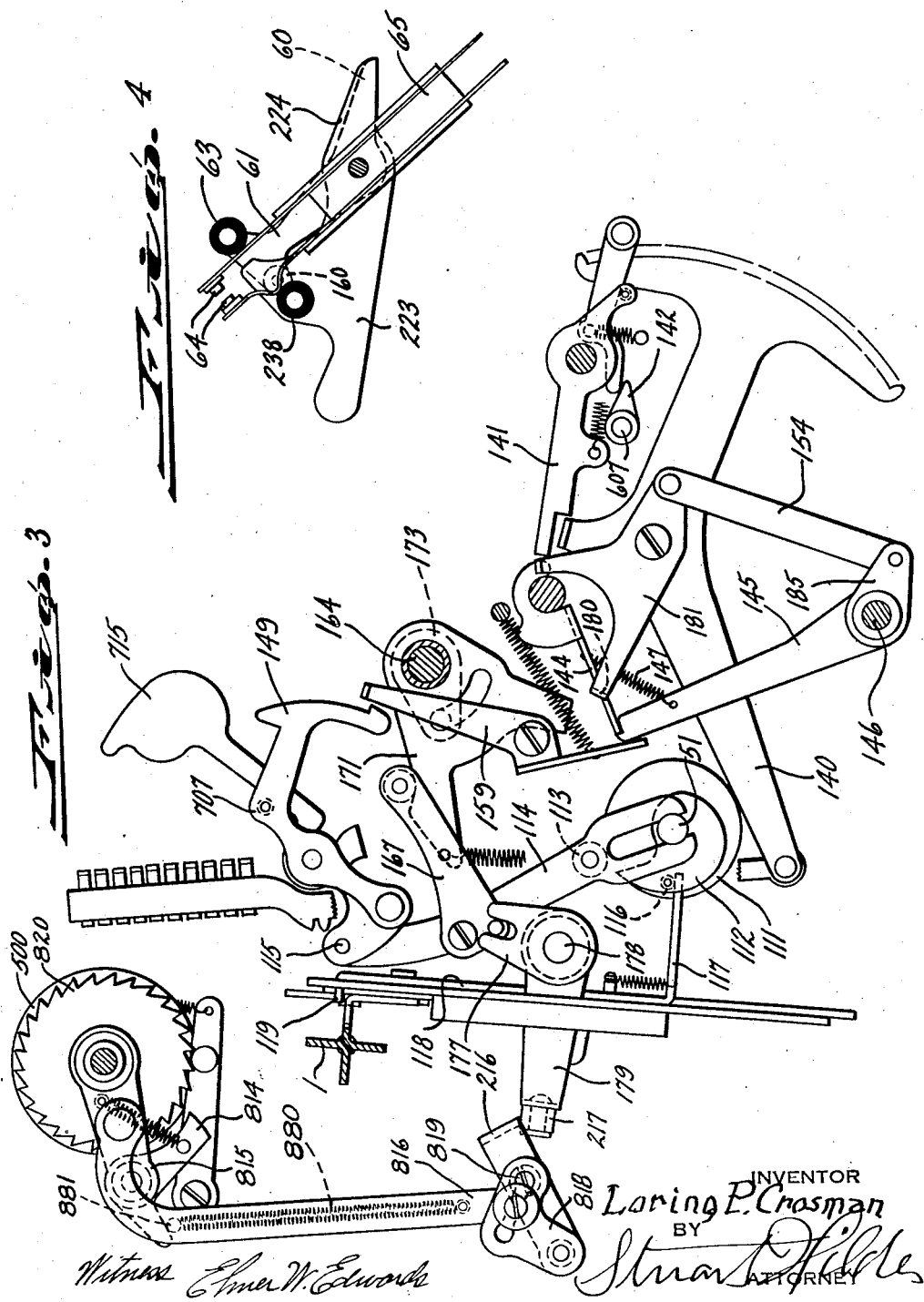

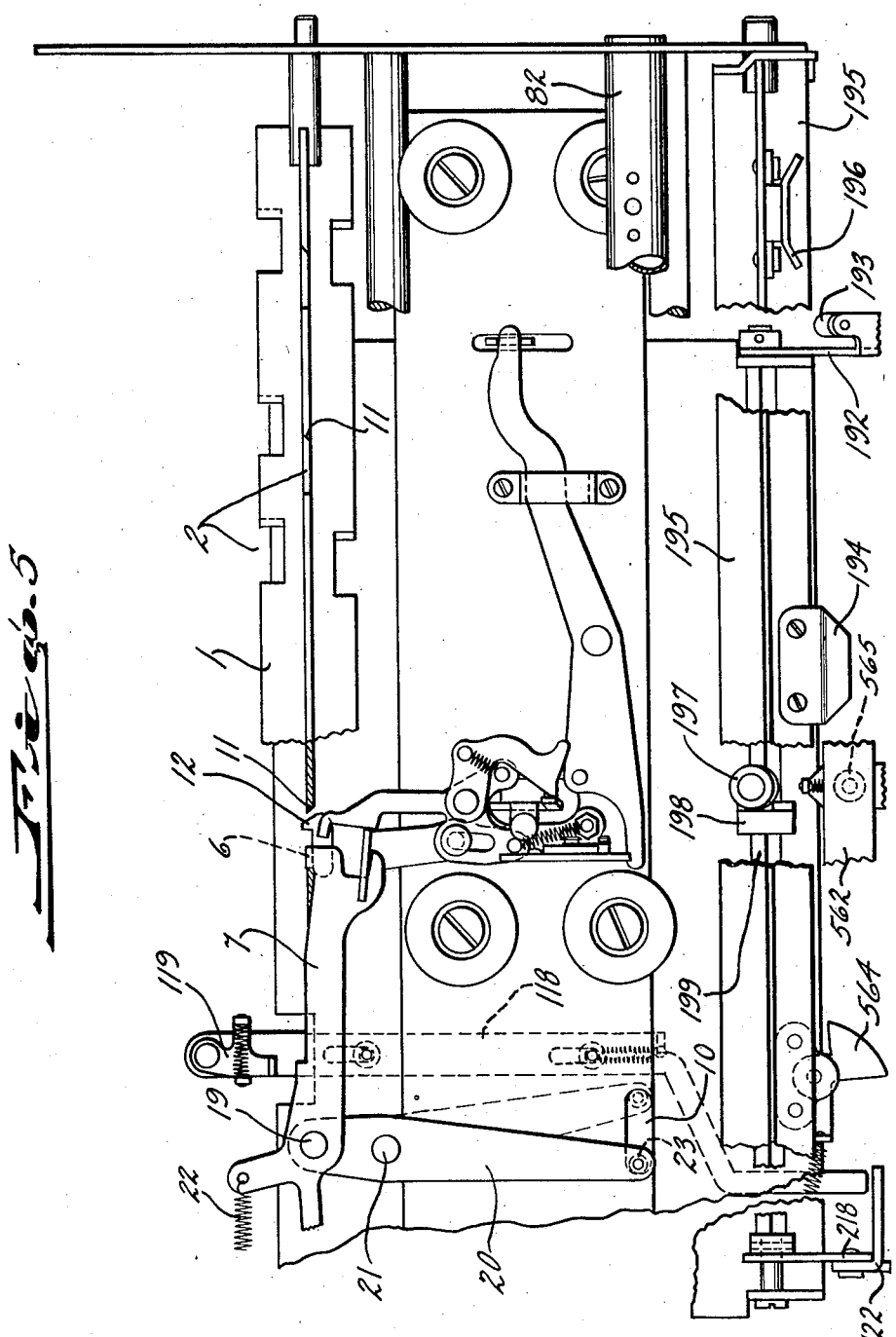

Jan. 18, 1944.                L. P. CROSMAN                2,339,321
                       ADDING AND LISTING MACHINE
                         Filed July 7, 1943            7 Sheets-Sheet 5
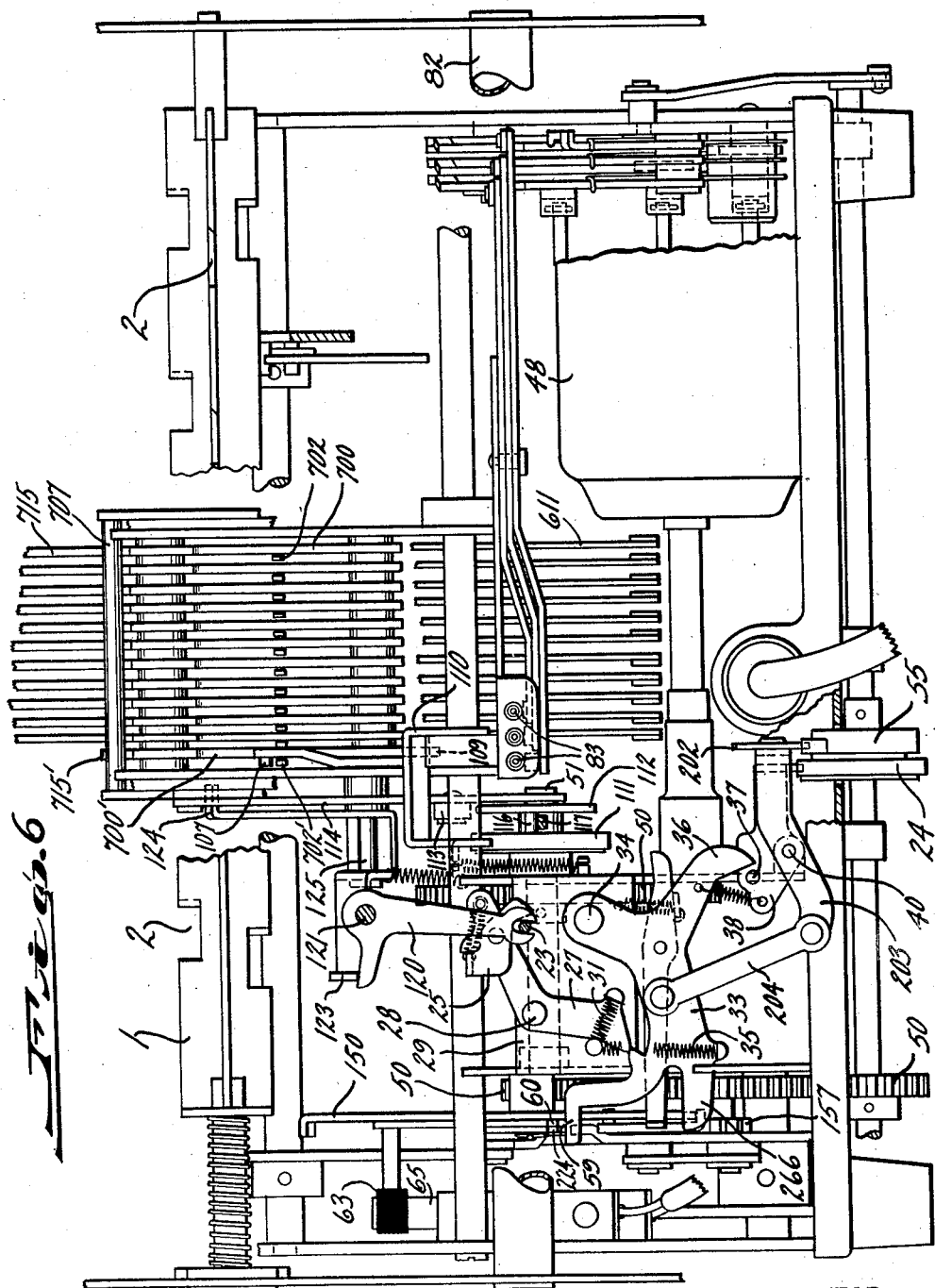
INVENTOR
Loring P. Crosman
BY
Stuart Wilde
ATTORNEY
Witness
Elmer W. Edwards

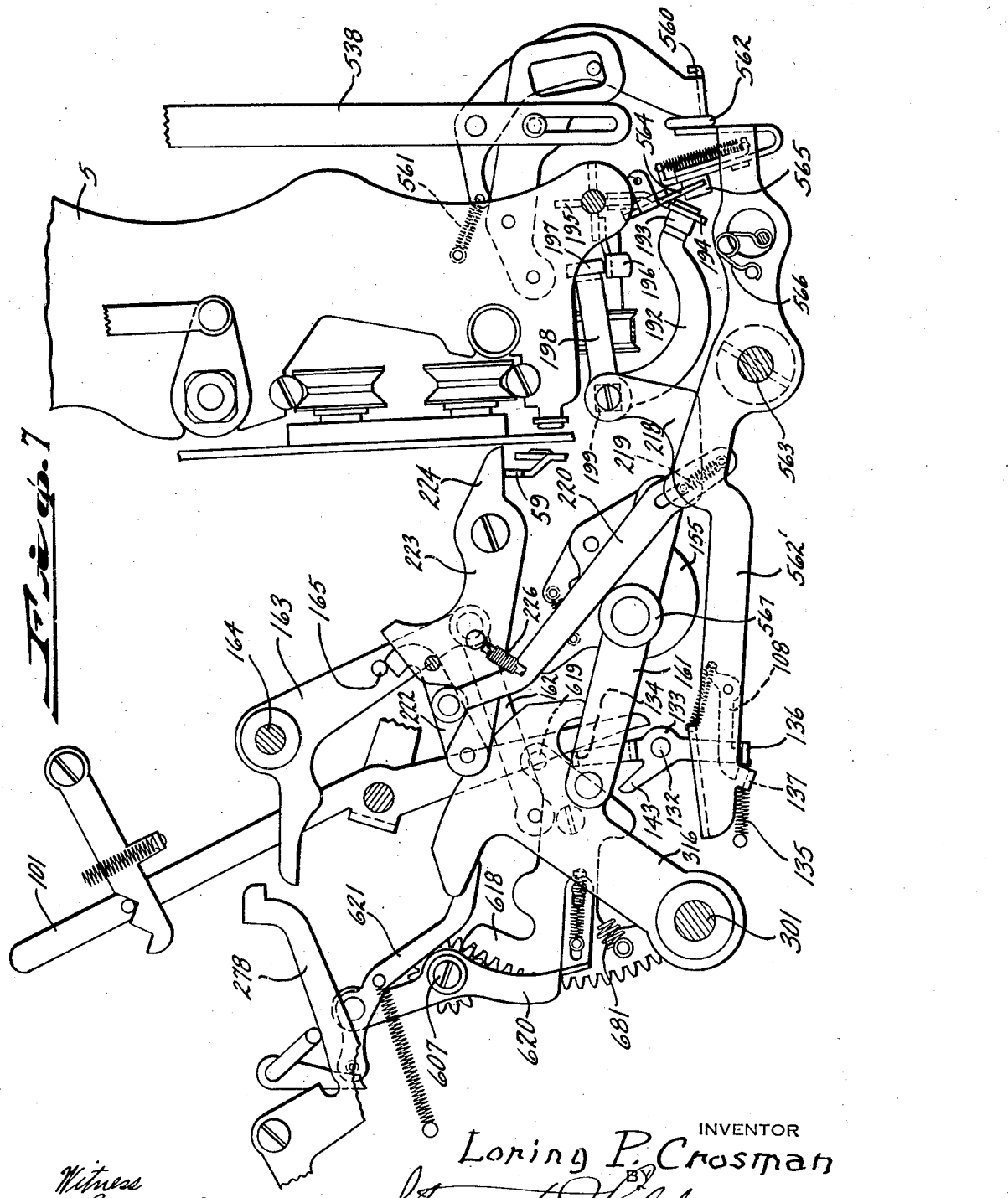

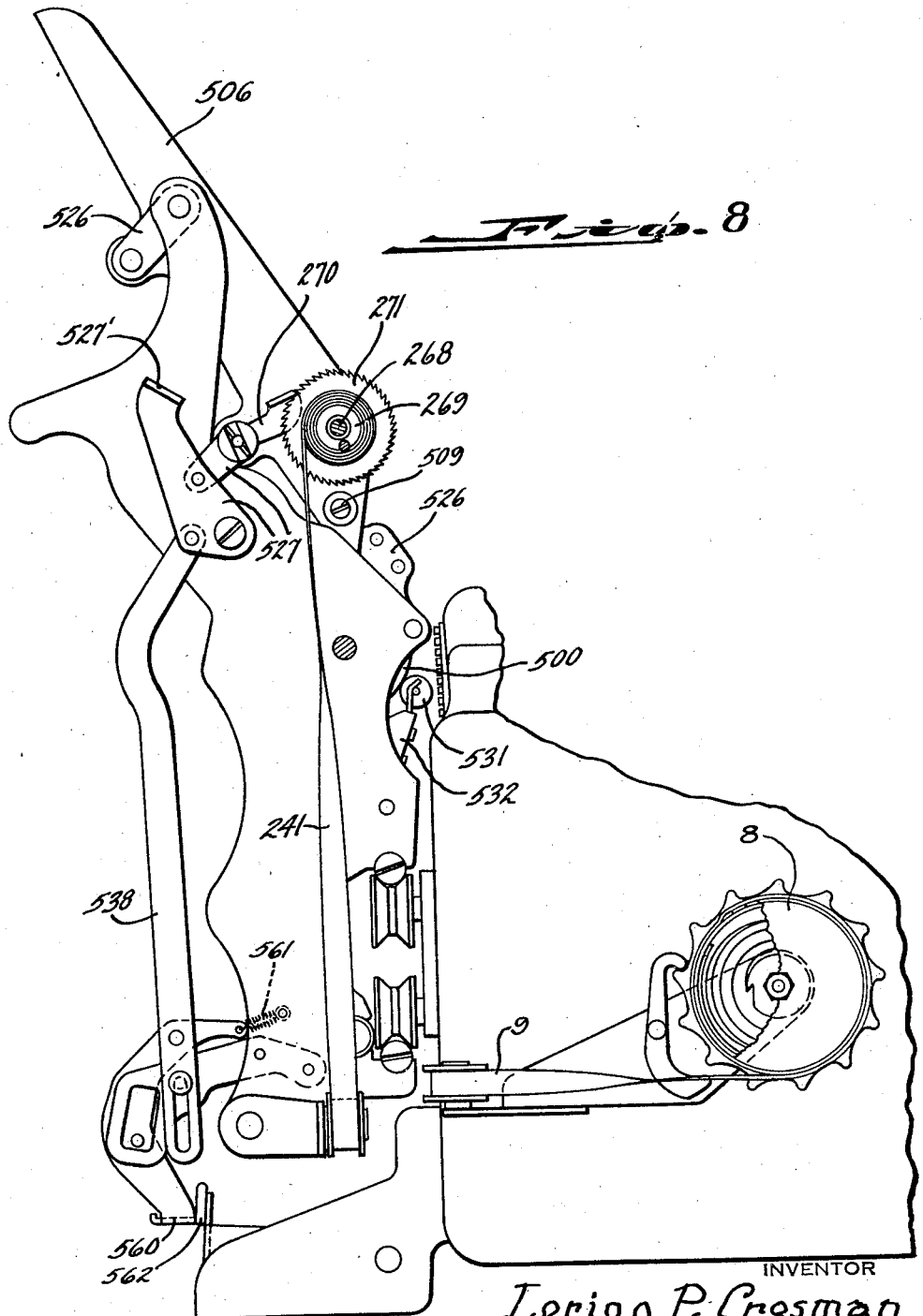

Patented Jan. 18, 1944

2,339,321

UNITED STATES PATENT OFFICE 2,339,321

ADDING AND LISTING MACHINE

Loring Pickering Crosman, South Orange, N. J., assignor to Monroe Calculating Machine Company, Orange, N. J., a corporation of Delaware Application July 7, 1943, Serial No. 493,796

3 Claims. (Cl. 101—93)

The invention has relation to adding and listing machines and more particularly to means whereby such a machine may be set to automatically reprint items and totals upon a record sheet. Such means would be useful, for instance, in making out public utility statements, which customarily comprise a statement sheet proper and a series of detachable stubs, upon each of which amounts representing various items and the total thereof are printed. Commonly such statements are prepared upon machines having a separate printing head for each column to be printed, making for a bulky, power consuming installation, or upon billing machines provided with a single printing head, wherein a complete machine cycle is performed in relation to each column, including the setting up of the type, the printing action and the restoration of the parts to normal. The present invention contemplates the provision of means for arresting the differential actuator drive in mid cycle position while initiating a secondary drive adapted to operate the type hammers for repeated listings under control of a transversely shiftable platen carriage.

In the contemplated mode of operation, values printed in the left hand column during a machine cycle are successively reprinted in a plurality of columns on the record sheet, the platen carriage being thereafter automatically returned to its initial position and the record sheet automatically advanced to the next printing line. Following the registration and printing of a series of items a total may be taken and reprinted in relation to each item column, following which the record sheet is automatically ejected and the carriage returned.

The invention consists in the novel construction and combination of parts, as set forth in the appended claims.

In the embodiment of the invention illustrated herein, an adding and listing machine is shown constructed substantially in accordance with the disclosure of United States Patent No. 1,867,002, issued July 12, 1932, to Clyde Gardner; as modified by the disclosures of United States Patent No. 1,915,296, issued June 27, 1933; No. 1,946,572, issued February 13, 1934; and No. 2,081,423, issued May 25, 1937; all to Loring P. Crosman.

In the accompanying drawings, illustrating the invention,

Fig. 2 is a vertical section taken through the keyboard and the registering and printing mechanisms.

Fig. 3 is a detail left side elevation of the negative total control devices and of the repeat printing mechanism.

Fig. 4 is a detail of certain parts used for closing the motor circuit.

Fig. 5 is a detail rear elevation of the carriage releasing means.

Fig. 6 is a fragmentary rear elevation of the machine with the carriage removed and showing certain parts controlling the register setting clutch.

Fig. 7 is a right side elevation of certain control means associated with the platen carriage.

Fig. 8 is a left side elevation of the platen carriage and rear portion of the machine, with the carriage shown in closed or normal operating position.

Registering means

Figure 1:
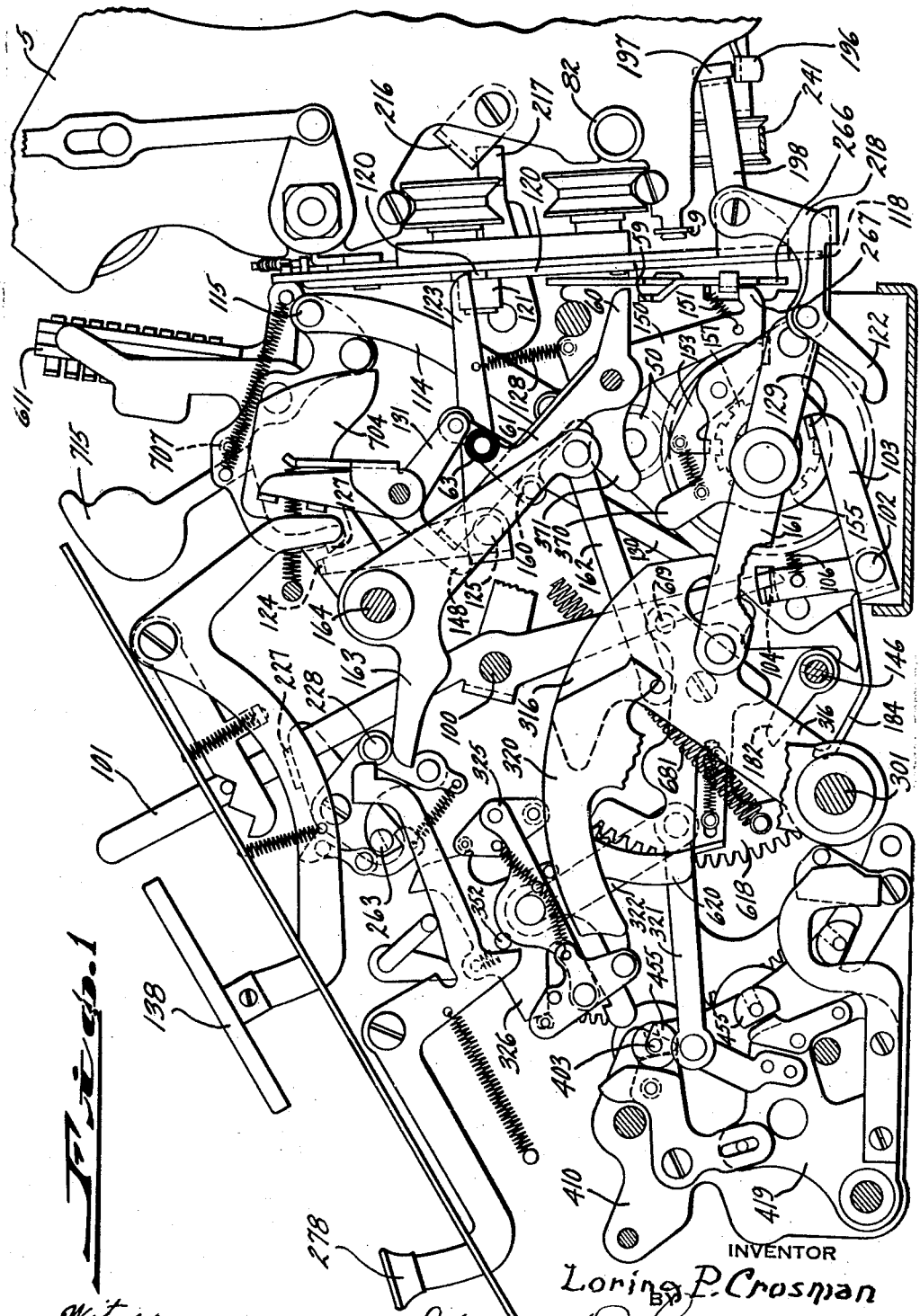
Fig. 1 is a right hand elevation of the machine with the casing removed and parts broken away.

The adding and listing machine to which the invention is shown as applied is of well known type. It will be sufficient to say that for each denominational order the machine is provided with a three-armed differential actuator lever numbered 610 (Fig. 2), these levers being loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys 215 which have been depressed to represent a value are latched in position with the bottoms of their stems lying in the path of movement of the related stop lugs of the bars 615, allowing such bars to advance a distance proportional to the value of the key, upon operation of the machine. Depression of a digit key will also remove a column latch 214 from the path of movement of its related bar 615, these latches preventing movement of a stop bar and lever 610 in any column in which no key is depressed.

A rock shaft 301 is provided with cam means 318 for governing the movement of a spring tensioned rocker frame 616, mounted on shaft 608, frame 616 carrying a series of dogs 617 normally engaged by studs 659 of the levers 610. As shaft 301 is rotated counterclockwise, as seen in Figure 1, frame 616 will be rocked, and any of the levers 610 which have been released by the depression of digit keys 215 will be allowed to rotate under the influence of their springs 683, until they are stopped by the lugs of bars 615 contacting with the stems of the keys. Upon reverse or clockwise rotation of shaft 301, the dogs 617 will return the operated levers 610 to normal position. This excursion of the levers 610 serves to register amounts set into the keyboard upon one or more accumulators and to set up a similar amount on the printing line of the type bars.

Shaft 301 is oscillated by an electric motor 48 connected through gearing 50 (Fig. 6) and suitable clutch means with a crank arm 155 (Fig. 1) from which motion is transmitted, through connecting rod 161, to a cam 316, fast with shaft 301. As described in the reference patents, disengagement of latch 148 from clutch lever 150, upon depression of operating key 138 will allow said lever, under influence of spring 151, to be rocked out of engagement with the laterally bent end of a spring urged pawl 153 pivotally mounted upon the crank arm 155, allowing said pawl, under influence of its spring, to be rocked into engagement with a notched clutch disk 157, fast to the hub of one of the gears 50 (Fig. 6).

Simultaneously with the above described engagement of the clutch, lever 150 will contact a stud 160 fast to a lever 61, and rock said lever downwardly to cause the insulated roller 63 fast thereto to contact the points 64 (Fig. 4) of a switch 65 interposed in the motor circuit and initiate an operating cycle of the machine.

Upon release of key 138 latch 148 will return under spring action into latching position and toward the end of the cycle of operation a projection 370 of crank arm 155 will contact an arm 371 of lever 150 and will force said lever back into normal position, engaging the latch, breaking the electric circuit and bringing the end of said lever into the path of movement of pawl 153 to disengage said pawl from clutch disk 157.

The positive or negative character of the registrations to be effected is determined by the following mechanism, fully described in the patents above referred to:

The segmental racks of the levers 610 are designed to operate the accumulator wheel gears 472 (Fig. 2) of one or more accumulators.

The accumulator shafts 403 are slidably mounted in slots of frame plate 410 (Fig. 1) and when one or more of the accumulators are set to active position the gears 472 thereof are brought into mesh with the racks of the levers 610, where they are held, against spring tension exerted on shafts 403, by rocking cam plate 419, engaging cams 455 of said shafts.

The cam plate 419 has connection through link 321 with an arm 322 of a rocker device 325, provided with two cam followers adjustable by key set control devices to different positions relative to cam arms 316 and 320 respectively of rock shaft 301.

Normally these control devices are set as in Fig. 1 to provide for additive registration, wherein the accumulator shaft or shafts 403 will be moved away from the racks of levers 610 before said racks are allowed to move, and will be moved to reengage the gears 472 while the racks lie in the extreme positions permitted by the keys 215 and stop bars 615. As shaft 301 is returned and the racks allowed to rise, the values set into the keyboard will be additively transferred to the register.

The type bars 611 are provided each with a row of type, representing the digits 1 to 9 and zero, the zero type being normally on the printing line. When the levers 610 are moved in accordance with a key setting, the related type bars will be raised to bring the appropriate type to the printing line. Type hammers 715 are adapted to be operated by spring actuators 700 but are normally held in tensioned position by latches 701. When a type bar is lifted a related tripping finger 702 is allowed to move into engagement with the corresponding latch 701, and at the end of the counterclockwise rotation of shaft 301, a frame 711 upon which the tripping fingers are mounted is moved forwardly, releasing the hammers from those latches which have been engaged by the fingers 702. In order to print zero characters in the lower order places wherein no amount from 1 to 9 has been set up, the higher order latches 701 are provided with offsets 703, lying in the planes of and designed to trip the lower order latches. The hammers are restored and relatched during the return rotation of shaft 301 by means of a bail 707, operated through a reciprocatory cam 704 fast to a shaft 164 upon which is secured arm 163 having link connection 162 with the power operated cam 316.

Near the end of the return stroke of a cycle arm 163 will cooperate with a roller 228 of the keyboard clearout devices to operate rocker 227 and release keys 215.

*Tabulation*

The transversely shiftable platen carriage, whereon the record sheet is held, is tabulated to bring successive columns of said sheet into position opposite the type bars, in accordance with the disclosure of Patent No. 1,946,572.

A tabulating bar 1 (Figs. 5 and 6) mounted in the platen carriage 5 is provided with a series of notches 2 spaced in accordance with the columnar positions of a given form sheet, said bar being adapted by engagement of the wall of a notch with projection 6 of a lever 7, supported from the stationary frame of the machine, to secure the carriage against lateral movement under the influence of a spring drum 8 (Fig. 8).

Spring drum 8 is mounted upon the left hand casing of the machine and has suitably secured thereto one end of a tape 9, the other end of which is secured to the right hand frame of the carriage. Upon disengagement of the projection 6 of lever 7 from the wall of notch 2, as will be described, drum 8 will act to move the carriage toward the right, as viewed in Fig. 5. Lever 7 is fulcrumed at 19 upon a lever 20, fulcrumed at 21 upon the rear casing of the machine and provided with a stud 23 having contact with the walls of an aperture 10 of the casing to limit the movement of lever 20.

In starting a series of operations the carriage is shifted to bring the left hand column into printing position, cam surfaces 11 of notches 2 ratcheting over surface 12 of lever 7 to permit uninterrupted movement of the carriage.

Disengagement of bar 1 from projection 6 of lever 7 will allow said lever, under the influence of spring 22, to move toward the left, thus rocking lever 20 to the position indicated by dotted lines in Figure 5.

As the carriage locates in its right hand position, projection 6 of lever 7 will reengage a corresponding notch 2 of tabulating bar 1 and, under the influence exerted by spring drum 8, said bar will restore the levers 7 and 20 to their normal positions.

*Reprint means*

Fulcrumed upon a transverse rod 100 (Fig. 1) is a two-position lever 101 adapted in the forward setting thereof to adjust means for automatically reprinting items and totals as hereinafter described. Operation of lever 101 to forward or repeat position will adjust certain mechanisms as follows:

1. Set means to disengage the main operating clutch to interrupt the machine cycle at mid cycle position.
2. Adjusts a tripping finger into position to control operation of the reprint clutch.
3. Adjusts means for preventing ejection of the record sheet from the platen carriage during item reprint operations.

With the reprint lever 101 adjusted for repeat printing and a value set up on the keys 215, depression of operating key 138 will initiate a machine cycle by disengagement of lever 150 from pawl 153, permitting engagement of said pawl with notched disk 157 as previously described.

Fulcrumed at 102 is a bell crank lever 103 provided with a laterally extending projection 104 having engagement with a downwardly extending arm of the repeat print lever 101. Adjustment of lever 101 to repeat print position will rock the lower arm thereof toward the rear of the machine, whereupon bell crank lever 103 will be free to rock in a clockwise direction under influence of its spring 106, bringing projection 104 of said bell crank into the path of movement of the lateral projection of clutch pawl 153. As previously described, the printing hammers 715 are tripped near the end of the forward stroke of the differential actuating levers. Simultaneously with the release of the printing hammers the projection of pawl 153 will engage projection 104 of bell crank 103, and said pawl will be rocked out of engagement with the driving disk 157, bringing the machine to rest at mid cycle position.

As shown in Figs. 2 and 6, the usual hammer tripping mechanism has been extended to include one additional place to the right of the right hand printing hammer, wherein it will control the operation of a spring actuator 700', tensioned by a dummy hammer 715'. This column will come under the control of a pin 107 fast to a rearwardly extending arm of the repeat print lever 101. As the lever 101 is moved to its forward or repeat print position, pin 107 will be carried upwardly, permitting the related tripping finger 702' to be moved into active position with relation to the corresponding latch 701.

Upon forward movement of frame 711, to release the printing hammers spring actuator 700' will also be released, a projection 109 of said actuator lifting a clutch detent 110, releasing one-cycle clutch 111.

Clutch 111 is mounted upon the shaft 51 of the machine operating reduction gear train 50, previously described, and operates at approximately twice the speed of the machine cycle. Fast to the driven member of clutch 111 is a snail cam 112 (Fig. 3) adapted to engage a roller 113 fast to an arm 114. The lower end of arm 114 is guided by a groove cut in shaft 51 and the upper end of said arm has pivotal connection 115 with the hammer restoring bail 707.

A stud 116, secured at one end in snail cam 112 and at its other end in the clutch housing, normally overlies a forwardly extending projection 117 of a slide 118 mounted upon the rear casing of the machine, as shown in Figs. 3 and 5.

Slide 118 is provided with a pawl 119 having a projection overlying the carriage positioning lever 7 and upon operation of clutch 111 stud 116 will momentarily displace slide 118 to disengage projection 6 of lever 7 from tabulating bar 1, whereupon the carriage 5 will be shifted, under influence of spring drum 8, until engagement of projection 6 with a notch 2 corresponding to the next columnar position. In order to insure prompt release of lever 7 during this operation, the retractive movement of lever 20 will move a shoulder of lever 7 from beneath pawl 119, so that projection 6 will snap back into tensioned engagement with the flange of bar 1. While the carriage is shifting snail cam 112 will engage roller 113 and through arm 114 will rock bail 707 to restore the type hammers 715.

In the event the platen carriage completes a shift before the one-cycle clutch 111 completes its cycle of operation, roller 113 is released from the high point of snail cam 112 and allowed to fall to the low point thereof to release restoring bail 707 and printing hammers 715.

In order to effect a delayed tripping of the hammers in case the one-cycle clutch completes its operation while the platen carriage is shifting, the following means are provided:

As earlier described, upon release of projection 6 from tabulating bar 1 the stud 23 carried by lever 20 is moved to the position illustrated by the dotted lines of Fig. 5, remaining in such position until reengagement of projection 6 with the notch 2 of bar 1 corresponding to the next columnar position, whereupon lever 20 and stud 23 will again return to normal position. As shown in Fig. 6 stud 23 engages the bifurcated end of a bell crank lever 120 pivotally mounted at 121 upon the rear casing of the machine. An arm of bell crank lever 120 underlies a rearwardly extending arm 123 of a latch 124 (Fig. 1) fulcrumed upon sub-framing at 125. Normally stud 23, through bell crank 120, will hold the engaging end of latch 124 forwardly out of the path of movement of the hooked end 127 of the hammer restoring bail 707. During the operation of the platen carriage, as above described, stud 23 will rock bell crank lever 120 in a counterclockwise direction (Fig. 6), allowing latch 124, under influence of its spring 128, to rock in a clockwise direction (Fig. 1), carrying the engaging end thereof into cooperative relation with hooked end 127 of restoring bail 707. As said bail is restored by action of snail cam 112, hook end 127 will engage the latch, restraining the hammers 715 until carriage 5 has completed a shifting operation. Upon completion of the carriage shift, reengagement of projection 6 of the carriage locating lever 7 with the tabulating bar 1 will restore stud 23 to normal position, whereupon said stud, acting through bell crank 120, will disengage latch 124 from the hammer restoring bail. The machine operation having been interrupted at mid cycle, as previously described, the rocking frame 711 will hold the hammer latches 701 which have been tripped by the active tripping fingers 702 out of engagement with their related hammers 715. Therefore, upon release of restoring bail 707 from latch 124 and from cam 112, the active hammers 715 will again be free to move under influence of their respective springs to reprint the values stored in the type members 611.

Upon operation of the hammers 715, the one-cycle clutch 111 is again tripped in the manner previously described and the tabulating and reprint means will thus continue to operate, printing in each column until the carriage 5 reaches its extreme left hand or some predetermined position, whereupon the machine will automatically complete the main operating cycle, advance the platen through suitable line spacing devices, and return the platen carriage to its initial starting position.

Automatic carriage return means

Extending transversely of the carriage 5 is a bar 195 (Figs. 5 and 7) provided with cams 194 and 196 adapted to control the action of means for returning the carriage to its initial position. The cam 194 is so positioned upon the bar 195 that as the carriage is shifted to its left hand printing position (right hand as viewed in Fig. 5) said cam will engage a roller 193 carried by an arm 192 secured to a square shaft 199.

Engagement of cam 194 with roller 193 will rock said roller downwardly and shaft 199 will be rocked clockwise, as viewed in Fig. 7.

Fixed upon shaft 199 is a forward arm 218 (Fig. 1) which upon rocking of shaft 199 will carry the laterally projecting lug of a pawl 122, mounted upon said arm, into position below the slide 118. Following the printing operation in the left hand position of the carriage, slide 118 will act to rock the pawl 122, bringing the forward end thereof into operative engagement with a projection 129 of lever 103, serving to restart the machine cycle by rocking the projection 104 of said lever out of engagement with the clutch pawl 153, whereupon the machine will complete the last half of its cycle of operation. As previously stated, this final action serves to restore the parts to their normal positions, and bail 707 being restored, the hammers and the spring actuator 700' will be restrained and the automatic repetition of the printing operation concluded. Arm 218 (Fig. 7) has yieldable connection 219 with a link 220, the other end of said link being pivoted to a latch 222 carried upon a plate 223. Upon rocking of shaft 199, arm 218, through link 220, will move latch 222 into the path of return movement of a pin 165 in the motor driven arm 163, said arm having been moved forwardly in the first half cycle of operation of the machine. During the last half cycle of operation pin 165 of arm 163 will effect rocking of plate 223, which plate has a yieldable link connection 226 adapted to operate a friction clutch for effecting return of the carriage, as fully described in the reference patents.

Upon movement of the platen carriage into its right hand position (left hand in Fig. 5), a cam 196, mounted on bar 195 of the carriage, will encounter a roller 197 fast to an arm 198 secured to the square shaft 199, rocking shaft 199 into its original position and thereby retracting latch 222 from the pin 165 in arm 163 and releasing the carriage return clutch.

An insulated roller 238 (Fig. 4) mounted upon plate 223 serves to hold the points 64 of motor switch 65 in engaged position during the carriage return operation.

Automatic line spacing

Line spacing of the platen may advantageously be effected by an impulse timed to follow the printing action, the spacing being delayed when repeated printing is effected, by the interruption of the machine cycle. Special means may be employed for disabling the line spacing action, in normal or non-repeat printing operations, until the carriage arrives in its left-hand position, but since this special means is not necessary for repeat printing operations, it has not been shown. Line spacing is effected as follows:

Pivotally mounted at 819 (Fig. 3) in the framing of the carriage and extending transversely thereof is a bar 216 (Figs. 1 and 3) normally held in raised position by means of a roller 217 secured to an arm 179 fulcrumed in the base of the machine at 178 and adapted to be operated by reciprocating movement of the cam 316, through link 162, arm 163, shaft 164, arm 173, lever 171, lever 167 and arm 177. During the forward stroke of the machine cycle, cam 316 will operate the above train of parts, rocking arm 179 and roller 217 downwardly, whereupon bar 216 will be free to move downwardly and allow spacing pawl 814 to rise and engage with the platen ratchet 820, through action of spring 880 anchored to the framing at 881, rigid lever extension 818 of bar 216 (fulcrumed at 819), link 816 and arm 815. The parts will remain in this position until the clutch is tripped to complete the last half of the machine cycle, whereupon the return movement of the parts will act to restore link 816 to normal position, advancing the platen and disengaging the pawl 814.

Accumulator setting program

Patent No. 1,946,572, discloses means for automatically readjusting the plus, minus, non-add controls of the several accumulators according to a program of successive operations. According to the disclosure of said patent the adjustments are controlled by a tube mounted upon the platen carriage and provided with four rows of graded perforations, sensed by feelers related to the different accumulators. Tabulation of the carriage will bring different perforations of a given row into register with the feelers, and rotation of the tube will also bring different perforations into register.

In the present machine a program device, adjustable to change the control in the last mentioned manner, would be useful, since it would provide for the proper distribution, etc., of the various items among the accumulators. However, if the mechanism provides for a change of control in each tabulated position of the carriage, this action should be disabled when the machine operates to reprint.

As in Patent No. 1,946,572, a perforated tube 82 (Figs. 5 and 6) is mounted in carriage 5 and is designed to cooperate with feelers 83 in the base of the machine in determining the angular positions of adjustment of cams 455 (Fig. 1), fast upon the accumulator shafts 403. Cams 455 are held in contact with the cam plate 419 by the accumulator adjusting springs, and the accumulators may be set into active position only when a high point of the related cam 455 lies opposite the cam plate 419.

Tube 82 may be rotated, manually or otherwise, each time the carriage is returned, to provide for proper registration of the succeeding item, the feelers being automatically operated, to adjust the cams 455, by clutch controlled means operated as the carriage is located in its left-hand position, as follows:

As the lever 20 is moved to the position indicated by dotted lines in Figure 5, in which position it will remain during the return of the carriage, the stud 23 is ratcheted over a trip pawl 25 (Fig. 6) pivotally mounted upon the upper arm of a latch 27, pivoted at 28 upon a bracket 29.

As the carriage locates in its right hand position, and lever 20 is returned, the stud 23 will contact trip pawl 25 and rock the latch 27 against the tension of its spring 31 to free said latch from engagement with a projection of a spring tensioned plate 33, pivotally mounted at 34 upon bracket 29.

Plate 33, released from latch 27, will be rocked clockwise about point 34 under influence of spring 35, and arm 36 of said plate will contact a pin 37 of clutch arm 38, engaging one-cycle setting clutch 24.

During the above described movement of plate 33 an arm 59 of said plate will engage projection 60 of the lever 61 (Fig. 1) to close the contact points 64 of motor switch 65.

Operation of setting clutch 24 will select the register and character of registration to be performed thereon, as fully described in Patent No. 1,946,572.

Near the end of the setting cycle cam 55 fast to the driven member of clutch 24 will engage a roller 202 of a rocker 203 fulcrumed at 40 upon bracket 29 and will restore plate 33 through link connection 204.

Upon completion of the above setting cycle a machine cycle may be initiated upon depression of operating key 138, as previously described.

As the platen carriage is shifted from column to column during the reprinting operations, reciprocatory movement is given to stud 23 of the tabulating mechanism, as above described. However, the setting clutch mechanism is rendered inoperative during the above operations by means of a projection 267 (Fig. 1) of the clutch operating lever 150, said projection in the operated position of lever 150 being adapted to overlie a projection 266 of operating plate 33, locking said plate in its normal position.

The restraint of plate 33 by projection 267 and the displacement of the latch 27 during the reprint operations might prevent the relatching of said plate before its release by the retraction of clutch lever 150. Means are provided to insure that the latch will be restored and the consequent accumulator setting action delayed until the carriage is relocated in its right-hand position. For this purpose plate 223 is provided with a projection 224, overlying the projection 59 of plate 33, and upon the completion of the final halfcycle of operation, the rocking of plate 223 will move plate 33 slightly in a counterclockwise direction as viewed in Figure 6, allowing latch 27 to move into engaging position.

Total printing

A total is taken by releasing the differential actuator levers 610 and allowing them to rotate the accumulators subtractively until suitable projections on the accumulator wheels contact with zero stops mounted upon the frame. This will set the total in the type bars and, a machine cycle being started, the hammers will be tripped to print the total. During the return stroke of the oscillating frame 616 the levers 610 are reengaged therewith and moved rearwardly to normal position; the accumulator wheels being disengaged from the racks before the return stroke is made, whereby the register which has been totalized will stand at zero.

The machine is set for subtractive operation by contact of the total key 278 with a pin 352 (Fig. 1) of rocker control plate 326, the total key thus holding the plate free of the forward cam follower, so that rocker 325 will not be operated by said follower and the accumulator will not be disengaged at the beginning of the operation by the action of cam arm 320. On the return stroke of the parts, the forward cam follower, co-acting with cam arm 320, will disengage the accumulators from the segments. The described setting of plate 326 also disables the rear cam follower by camming it to inoperative position, whereby the accumulators will not be engaged during the return stroke.

Depression of the total key 278 will not only trip the column latches 214, through pin 263 and rocker 227, but will also trip a latch 620 through operation of a control arm 621 (Fig. 7) pivotally connected to said latch. Latch 620 normally engages a lug on total segment 618, preventing movement of said segment under the influence of the total spring 681. Upon tripping of the latch, segment 618 will operate a shaft 607, having a spirally arranged row of pins 651 (Fig. 2), acting to trip the latching dogs 617 successively from right to left of the machine, the tripping of said dogs releasing the racks 610 and also releasing the zero stops 613 so that they will fall into the path of the projections 457 on the accumulator wheels. The successive release of the differential actuator levers 610 by the latches 617 is essential because of the character of the tens transfer mechanism associated with the accumulator wheels, said mechanism being of the well known crawl type.

When the zeroizing operation has progressed to the left hand side of the machine, a pin 619 (Fig. 1) in the rearwardly extending arm of the total segment 618 will contact with a projection of a rod 130 connected at its other end to a trigger 131 adapted to release latch 148 to start the machine. The machine being put into operation, frame 616 will carry the dogs 617 forwardly, so that they will snap under the zero stops 613 and studs 659 of the actuator racks 610. The hammers will now be tripped to print the total and (lever 101 being set to reprint position) the operating cycle will be interrupted in the manner previously described.

The total may be printed immediately below the several items in each column or, if preferred, it may be offset from the item columns. The latter effect may be secured by adjustment of the tabulator bar 1 which, like the program tube 82, is rotatably adjustable and provided with a plurality of variably notched tabulating faces.

Upon movement of the platen carriage 5 into its left hand position, in a total reprint operation, the record sheet will be automatically ejected as follows:

Automatic paper ejection

As described in Patent No. 2,031,423, the record sheet is carried in a frame 506 (Fig. 8) which is adjusted relative to the platen carriage proper, the two frames being connected by links 526. A toggle link 527 between the two frames may be manually adjusted by means of thumb lug 527' into the position illustrated, wherein the record sheet will be held during printing operation against the platen 500 by means of idler rolls 531 mounted upon plates 532, adjustable by frame 506, said plates moving rolls 531 out of contact with the plates when the record sheet is ejected from the machine and a new sheet inserted.

In the movement of plate 532 to open position, a suitable pair of feed rolls (not shown) which are normally held apart are brought into contact, whereupon rotation of said rolls by means of carriage return tape 241 serves to eject the record sheet, as fully described in the above mentioned patent.

Tape 241 is fastened at one end to a drum 269 fast upon shaft 268 having suitable gear connections to the shaft 509 upon which the feed rolls are mounted. Feeding of a record sheet into the machine will wind tape 241 about drum 269. The other end of tape 241 is attached to a drum operated by the carriage return means previously described and more fully set forth in the reference patents.

The carriage is automatically opened by operation of rods 538 pivotally connected to the toggles 527 at opposite sides of the machine, a bail 560 being pivotally connected to the lower ends of the rods 538 and normally held by a spring 561 in position against the rear face of or above a bail 562, pivotally mounted in the base of the machine at 563 (Fig. 7). Spring 561 has a toggle effect upon bail 560 so that as the carriage frame is moved to closed position bail 560 will swing from a rearward held position toward bail 562.

In normal or non-reprint operations, as the platen carriage is moved into its left hand position, a cam 564 (Figs. 5 and 7) fast to the bar 195 will pass and depress a roller 565 yieldably mounted upon bail 562 and will rock said bail downwardly, whereupon bail 560, under influence of toggle spring 561, is moved forwardly to a position above bail 562.

During the return stroke of a machine cycle, a roller 567, fixed upon the driving link 161 between cam 316 and the driven member 155 of the main clutch, will contact a forwardly extending arm 562' of bail 562, rocking said bail upwardly. Upward movement of bail 562 will raise bail 560 and rods 538, thereby straightening toggle 527 to adjust the feed devices for paper ejection.

Straightening of toggles 527 rocks a pawl 270 out of engagement with the ratchet teeth 271 of drum 269 and as tape 241 is tensioned in the carriage return operation, said tape will first rotate drum 269, ejecting the record sheet, and will thereafter act to return the carriage to starting position.

In the adjustment of lever 101 to reprint position, however, a latch 133 (Fig. 7), fulcrumed at 132 and provided with a projection 134 engaging the lower end of lever 101, will be adjusted under influence of spring 135 to bring a projection 136 thereof into the path of movement of a projection 137 of the arm 562' of bail 562. Bail 562 will thus be locked in raised position against subsequent depression of roller 565 by the cams 564. Thus upon return movement of the carriage during item reprint operations said carriage will remain in closed position, with the toggle 527 in the bowed position illustrated in Figure 8, and pawl 270, remaining in engagement with the teeth of ratchet 271, will prevent ejection of the record sheet.

During total reprint operations, however, pin 619 of total segment 618, will engage an arm 143 of latch 133, moving the projection 136 of said latch rearwardly beyond its normal unadjusted position, where it will be engaged by an auxiliary spring latch 108, mounted upon arm 562' and extending above projection 137. Arm 562', being free of latch 133, will be raised by the action of cam 564 as the platen carriage moves to its final total printing position, moving latch 108 out of restraining engagement with latch 133, the latter moving forwardly into engagement with lug 137 and resuming its latching position when arm 562' is restored. Thus bail 562 is moved downwardly beneath bail 560 to adjust the paper ejection means to provide for ejection of the record sheet upon return movement of the carriage following the final total reprint operation.

Negative totals

As fully described in Patent 1,915,296, printing of a true negative total will involve three cycles of machine operation and two type setting actions of segment 618, the total being printed at the end of the forward stroke of the third cycle.

Means are therefore provided, as hereinafter described, to prevent interruption of machine operation during the first two cycles in reprinting negative totals.

In taking a total amounts which have been carried up to the accumulator wheel located to the left of the keyboard by the action of the tens transfer mechanism are set up for printing by means of a two-armed lever 140 (Fig. 3) similar to the levers 610, but having no connection with the keyboard. This lever 140 is normally held inactive by a latch 141, which in total taking is tripped by a finger 142 on the shaft 607 controlling the successive release of the segments. If the total is negative, the complemental registration in the accumulators will include a 9 in the above mentioned left hand wheel, and the movement of lever 140 from 8 to 9 printing position is utilized to set the true negative total devices in operative position. (It may be noted that this negative total mechanism limits the capacity of the left hand wheel to a normal registration of 8.)

In moving from 8 to 9 printing position lever 140 contacts with a latch plate 144 and moves said plate out of engagement with an arm 145 fast to a shaft 146 controlling the negative total devices, said shaft being thereupon rocked by spring 147 and remaining in rocked position until restored during the second cycle of machine operation in the manner fully described in the above patent.

Rearward movement of arm 145 will also allow a spring actuated latch 159 to move into engagement with the hooked end 149 of the hammer restoring bail 707, latching said bail to prevent a printing operation of the hammers 715 during the first two cycles of operation.

The line spacing of platen 500 is prevented by a projection 180 of a pivoted member 181, having link connection 154 with an arm 185 fast to shaft 146, said projection in the operated position of member 181 being positioned rearwardly of a downwardly projecting arm of lever 171 of the line spacing mechanism, preventing the operation of said mechanism by the spring 880.

Fast to the negative total shaft 146 is an arm 182 (Fig. 1) adapted in the operation of said shaft to be rocked downwardly, engaging a forwardly extending arm 184 of the lever 103, restoring said lever to normal position, thus holding the projection 104 of said lever free of the lateral projection of clutch pawl 153. The machine will thus be free to operate until shaft 146 is restored, during the last half of the second cycle of negative total operation, wherein arm 182 being restored to normal, projection 104 of lever 103 will again be positioned to disengage pawl 153 during the third or printing cycle of operation.

Tripping of the repeat print clutch 111 is delayed because of the restraining of the printing hammers during the first two cycles of operation, spring actuator 700' being restrained therewith.

The negative total having now been printed, the reprinting of said total and subsequent operation of the parts will be the same as described for normal total operations.

I claim:

1. In a motor operated adding and listing machine having cyclic operating means including a main clutch, type differentially settable by said operating means during the first half of a cycle of operation and restored during the last half of said cycle, and spring operated printing hammers; means including an auxiliary clutch operable to tension and release the printing hammers, normally inactive control means operable to repeatedly engage the auxiliary clutch, means settable to effect disengagement of the main clutch in half-cycle position and to activate the control means, and means timed to operate at the conclusion of a given number of operations of the auxiliary clutch to reengage the main clutch.

2. In a motor operated adding and listing machine having cyclic operating means including a main clutch, type differentially settable by said operating means during the first half of a cycle of operation and restored during the last half of said cycle, spring operated printing hammers, and record tabulating means; normally inactive control means settable to cooperate with the printing hammers to activate the tabulating means, means including an auxiliary clutch operable to tension and release the printing hammers, normally inactive control means settable to cooperate with the tabulating means to engage the auxiliary clutch, means settable to effect disengagement of the main clutch and to set the tabulating control and the auxiliary clutch control means to active position, and means timed to operate in a given tabulated position of the parts to reengage the main clutch.

3. In a motor operated adding and listing machine having cyclic operating means including a main clutch, type differentially settable by said operating means during the first half of a cycle of operation and restored during the last half of said cycle, spring operated printing hammers, and special operation control means providing for preliminary non-print cycling and a final printing cycle; normally inactive reprint means operable to repeatedly tension and release the printing hammers, and means settable to effect disengagement of the main clutch in half-cycle position and to activate the reprint means, said settable means including a yieldable element displaceable by the special operation means to disable the setting action during the preliminary non-print cycling.

LORING PICKERING CROSMAN.